(12) United States Patent
Dahlbäck et al.

(10) Patent No.: US 7,715,518 B2
(45) Date of Patent: May 11, 2010

(54) METHOD, USE AND DEVICE CONCERNING CLADDING TUBES FOR NUCLEAR FUEL AND A FUEL ASSEMBLY FOR A NUCLEAR BOILING WATER REACTOR

(75) Inventors: Mats Dahlbäck, Västerås (SE); Magnus Limbäck, Västerås (SE)

(73) Assignee: Westinghouse Electric Sweden AB, Vasteras (SE)

( * ) Notice: Subject to any disclaimer, the term of this patent is extended or adjusted under 35 U.S.C. 154(b) by 0 days.

(21) Appl. No.: 10/517,020

(22) PCT Filed: Jun. 4, 2003

(86) PCT No.: PCT/SE03/00920

§ 371 (c)(1), (2), (4) Date: May 12, 2005

(87) PCT Pub. No.: WO03/004510

PCT Pub. Date: Dec. 18, 2003

(65) Prior Publication Data

US 2005/0265513 A1    Dec. 1, 2005

(30) Foreign Application Priority Data

Jun. 7, 2002    (SE)    ................................ 0201744

(51) Int. Cl.
G21C 3/00    (2006.01)
(52) U.S. Cl. .................... 376/409; 376/457; 148/672
(58) Field of Classification Search .............. 376/414, 376/416, 417, 457, 419, 442, 422; 420/422
See application file for complete search history.

(56) References Cited

U.S. PATENT DOCUMENTS

| | | | |
|---|---|---|---|
| 4,675,153 A * | 6/1987 | Boyle et al. ................. 376/416 |
| 4,718,949 A | 1/1988 | Takase et al. |
| 4,770,847 A | 9/1988 | Plaza-Meyer et al. |
| 4,775,508 A * | 10/1988 | Sabol et al. ................. 376/416 |
| 4,933,136 A * | 6/1990 | Foster et al. ................ 376/416 |
| 5,073,336 A * | 12/1991 | Taylor ......................... 376/457 |
| 5,245,645 A * | 9/1993 | Steinberg ..................... 376/457 |
| 5,519,748 A | 5/1996 | Adamsson et al. |
| 5,620,536 A * | 4/1997 | Dahlback ..................... 148/519 |
| 5,642,566 A * | 7/1997 | Hirabayashi .................. 30/228 |
| 5,654,993 A * | 8/1997 | Vesterlund et al. .......... 376/449 |
| 5,677,937 A * | 10/1997 | Vesterlund et al. .......... 376/260 |
| 5,901,193 A * | 5/1999 | Dahlback et al. ............ 376/416 |
| 6,088,419 A * | 7/2000 | Van Swam .................. 376/417 |
| 6,149,738 A * | 11/2000 | Dahlback .................... 148/421 |
| 6,243,433 B1 * | 6/2001 | Adamson et al. ............ 376/417 |
| 6,355,118 B1 * | 3/2002 | Taylor ......................... 148/421 |
| 6,542,566 B2 * | 4/2003 | Adamson et al. ............ 376/417 |
| 6,585,835 B1 * | 7/2003 | Dahlback et al. ............ 148/672 |
| 7,292,671 B1 * | 11/2007 | Dahlback et al. ............ 376/412 |

FOREIGN PATENT DOCUMENTS

| | | |
|---|---|---|
| EP | 0 194 797 | 9/1986 |
| EP | 0 674 800 B1 | 3/1997 |
| WO | WO 94/15343 | 7/1994 |

* cited by examiner

*Primary Examiner*—Rick Palabrica
(74) *Attorney, Agent, or Firm*—Hanify & King, P.C.

(57) ABSTRACT

The invention concerns a method of producing a cladding tube for nuclear fuel for a nuclear boiling water reactor. According to the method, a tube is formed which comprises an outer cylindrical component (10) mainly containing zirconium and an inner cylindrical component (20) metallurgically bonded to the outer component (10), wherein also the inner component (20) at least mainly contains zirconium. The inner component (20) has a lower recrystallization temperature than the outer component (10). The cladding tube is final annealed at a temperature and during a time such that the inner component (20) substantially completely recrystallizes and such that the outer component (10) partly recrystallizes but to a lower extent than the inner component (20). The invention also concerns a cladding tube, a fuel assembly for a boiling water reactor as well as the use of a cladding tube.

20 Claims, 1 Drawing Sheet

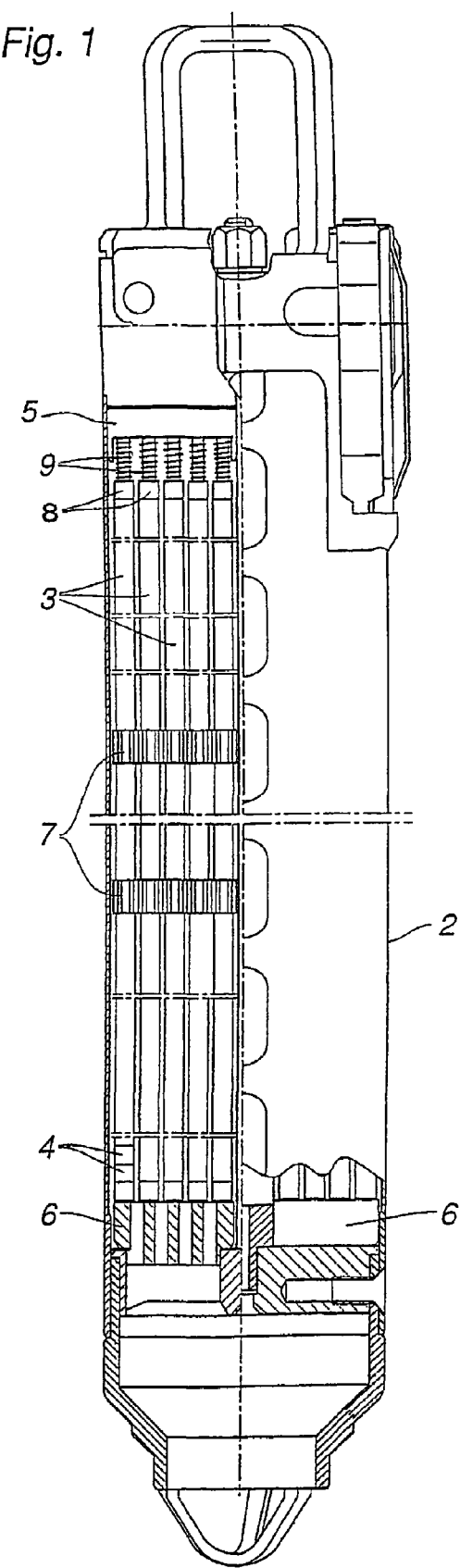
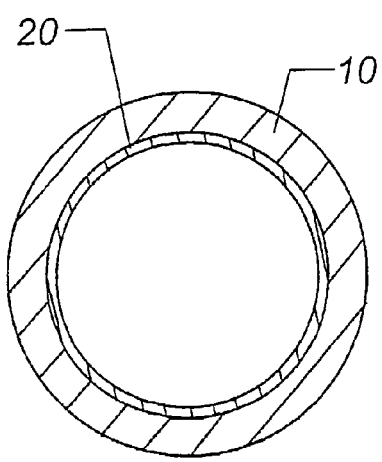
Fig. 1
Fig. 2

METHOD, USE AND DEVICE CONCERNING CLADDING TUBES FOR NUCLEAR FUEL AND A FUEL ASSEMBLY FOR A NUCLEAR BOILING WATER REACTOR

BACKGROUND OF THE INVENTION AND PRIOR ART

The present invention concerns a method of producing a cladding tube for nuclear fuel for a nuclear boiling water reactor, which method comprises the following steps:

forming a tube which comprises an outer cylindrical component mainly containing zirconium and an inner cylindrical component metallurgically bonded to the outer component, wherein also the inner component at least mainly contains zirconium, wherein the material compositions of the inner component and the outer component are selected such that they differ from each other and such that the inner component has a lower recrystallization temperature than the outer component.

The invention also concerns a cladding tube, a use of a cladding tube as well as a fuel assembly for a nuclear boiling water reactor comprising such a cladding tube.

A method of the kind that is described in the first paragraph above is known from the patent document EP 0 674 800 B1. In this document also the background to the invention described therein is described. When a cladding tube is used in a nuclear reactor it contains nuclear fuel, usually in the form of pellets containing enriched $UO_2$. The cladding tube with its content thus constitutes a fuel rod. Because of the very particular environment in which cladding tubes are used, different requirements must be fulfilled.

There are mainly two kinds of modern light water reactors: boiling water reactors (BWR) and pressure water reactors (PWR). In these kinds of reactors different conditions exist, which call for different requirements on the parts that are included in the reactors. In a PWR, the fuel rods are cooled mainly by water that is in a liquid phase under a high pressure. In a BWR, the pressure is lower and the water that cools the fuel rods is evaporated such that the fuel rods are surrounded both by water in a liquid phase and in a steam phase. Furthermore, the fuel assemblies have different construction in a BWR and a PWR. In a certain kind of BWR, the fuel rods in a fuel assembly extend the whole way between a top plate and a bottom plate which keep the fuel assembly together. In a PWR, on the other hand, the fuel rods are usually kept in position with the help of spacers and do not reach all the way to the top plate and to the bottom plate.

When a fuel rod is used in a nuclear reactor, it is exposed to neutron radiation. This leads to the fact that the cladding tube tends to grow with time. In certain kinds of BWR, the cladding tube has only a limited possibility to expand in the longitudinal direction. The cladding tube may therefore bend during operation. This can lead to damages. It should therefore be avoided that the cladding tube grows to a larger extent. Modern cladding tubes which are produced in suitable zirconium alloys and which undergo special heat treatments during the production often have a relatively low tendency to grow when they are exposed to neutron radiation. The tendency to grow may be reduced, inter alia, in that the cladding tube during the production undergoes a final recrystallization anneal.

Through a suitable choice of the material for the cladding tube and a suitable method of production, the cladding tube can obtain suitable properties concerning for example hardness and ductility. Since the conditions are different in a BWR and a PWR, the cladding tubes are produced with different properties depending on for which kind of reactor they are made.

In the environment where the cladding tubes are used they are subject to different corrosive attacks. These attacks may come from the outside or from the inside. The attacks from the inside often have their basis in an influence from the nuclear fuel material that is located there, so-called pellet-cladding interaction (PCI). If a crack is formed through the cladding tube (a so-called primary damage), water may penetrate in through the crack and spread along the inside of the tube. This may lead to new corrosive attacks from the inside of the tube, so-called secondary damages. A cladding tube of zirconium may also react with hydrogen such that hydrides are formed in the cladding tube. These hydrides may be formed from the inside of the tube, particularly if a crack has been formed such that water has penetrated into the tube. These hydrides make the tube more fragile and the probability for the formation of cracks increases. Particularly hydrides that extend in a radial direction through the tube constitute an increased risk for crack formation. Such radial hydrides may therefore speed up possible secondary damages and crack formations.

The complicated chemical, mechanical and metallurgical conditions that are the case in a nuclear reactor have lead to the fact that a very large number of suggestions have been proposed for the selection of materials and for the methods of production of cladding tubes. Even small changes in the composition of alloys or production parameters may have a large importance for the properties of the cladding tube.

Since different conditions are the case on the inside and on the outside of the cladding tube, cladding tubes are sometimes produced with different compositions in different layers. The above mentioned document EP 0 674 800 B1 thus describes the production of a cladding tube which has an outer component that is made of for example any of the frequently occurring alloys Zircaloy 2 and Zircaloy 4. The cladding tube has an inner component—a so-called liner—which according to an embodiment mainly consists of Zr with the alloying elements 0.25% Sn, 310 ppm Fe and 430 ppm O. The cladding tube is produced according to a particular method with carefully selected heat treatments. The cladding tube undergoes a final anneal at 570° C. during 1.5 h, which means a complete re-crystallization anneal (cRXA). The produced cladding tube has been shown to have a good resistance against corrosion even if water happens to penetrate into the inside of the cladding tube.

Another example of a cladding tube is clear from U.S. Pat. No. 4,933,136. This document describes a cladding tube consisting of an outer component of Zircaloy 2 or Zircaloy 4 and an inner component which according to one embodiment mainly consists of Zr with 0.19-0.20 percentage by weight Sn, 0.19 percentage by weight Fe and 615-721 ppm O. The document describes the production of the tube with different rolling steps and heat treatments. As a final anneal three alternatives are described in the document. According to the first alternative, a complete recrystallization (cRXA) occurs in both the outer and the inner component. According to a second alternative, a cRXA occurs in the inner component but only a stress relief anneal (SRA), i.e. no noticeable recrystallization, in the outer component. According to a third alternative, a partial recrystallization (pRXA) occurs in the inner component and an SRA in the outer component.

For cladding tubes which are constructed with two layers and which are intended to be used in a BWR, usually a final anneal is carried out which leads to a cRXA in both the layers. Thereby, a good resistance against damages caused by PCI can be achieved at the same time as the cladding tube has a good ductility and also obtains a structure that counteracts growth caused by neutron radiation.

SUMMARY OF THE INVENTION

An object of the present invention is to accomplish a method of producing a cladding tube for nuclear fuel for a nuclear boiling water reactor, which cladding tube has a good resistance against damages caused by PCI at the same time as the risk for the formation of radial hydrides is low. A further object is to achieve these advantages at the same time as the tendency to growth caused by neutron radiation is kept at a low level. Further objects and advantages of the invention will be clear from the following.

These objects are achieved with a method of the kind that has been described in the first paragraph above and which furthermore is characterised in that after that the cladding tube has been formed according to the above, and after possible rolling steps with there between occurring heat treatments, the cladding tube is final annealed at a temperature and during a time such that the inner component substantially completely recrystallizes and such that the outer component partly recrystallizes but to a lower extent than the inner component.

Since the inner component is substantially completely recrystallized (cRXA), the tube has a very good resistance against PCI damages. Since the outer component is partially recrystallized (pRXA), this component is relatively ductile at the same time as it does not grow to a too high extent when it is exposed to neutron radiation. By a suitable choice of material it has become clear that the growth of the cladding tube is so low that it is very well suited to be used also in the kind of BWR where the cladding tube only has a limited space for growth. Since the outer component only is pRXA, it has become clear that possible hydrides which are formed tend to extend in essentially a tangential direction while the risk for radial hydrides is low. Thereby an improved resistance against crack formation is obtained. The reason why radial hydrides are avoided is probably that certain tensions which originate from the production of the tube are maintained since the outer layer is not cRXA. These tensions have as a consequence that the tendency for radial hydrides is reduced.

By "substantially completely recrystallized" is here meant that the recrystallization is 100% (completely recrystallized) or almost 100% (at least recrystallized to 97% or 98%). An analysis of the cladding tube may thus show that the recrystallization in the inner component is not totally complete. It is preferred that the inner component is completely recrystallized.

It should be noted that the final anneal normally is the last heat treatment step in the production method. Possibly a certain after treatment of the cladding tube may be carried out, but such an after treatment should be such that the structure that is obtained through the final anneal is not substantially destroyed.

It should also be noted that according to a preferred embodiment, the cladding tube consists only of the outer component and the inner component (the liner). There are thus no further layers. The composition on the outer surface and the inner surface of the tube may however differ from the composition in the inner of the layers, for example due to the substances that the tube has come into contact with. The tube may for example be oxidised through the fact that it has been kept in an environment of air. According to an alternative embodiment, it is however feasible that the tube comprises one or more further layers in addition to the outer component and to the inner component.

Finally it is pointed out that when in this document % or ppm are used in connection with contents of different substances it is, if nothing else is said, referred to percentage by weight of the respective substances.

According to a preferred manner of carrying out the method according to the invention, the final anneal is carried out such that the degree of recrystallization in the outer component is higher than 50%. Suitably, the degree of recrystallization in the inner component is substantially or completely 100% and the degree of recrystallization in the outer component is suitable between 50% and 96%, particularly suitable 60% to 90%, for example between 70% and 90%. It has become clear that such degrees of recrystallization are particularly suitable for achieving the described advantages when the cladding tube is used in a BWR. Lower degree of recrystallization than 50% is possible, but this tends to lead to the fact that the growth of the cladding tube when it is exposed to neutron radiation is larger.

According to another preferred embodiment, the inner component does not contain more than 2000 ppm Fe and preferably not more than 1500 ppm Fe and most preferred less than 1000 ppm Fe. According to another preferred embodiment, the inner component does not contain more than 1000 ppm O. By keeping the contents of Fe and O low, a good resistance against PCI is obtained. It should be noted that the inner component may be produced in pure Zr (except for possible impurities) and thus not necessarily need to be an alloy.

According to a preferred embodiment, the outer component has a composition which is completely or substantially according to Zircaloy 2 or Zircaloy 4. These materials are common in connection with cladding tubes and have been shown to have many good properties. It should however be noted that the outer component does not need to be Zircaloy 2 or Zircaloy 4. Also other alloys may be used. For example different Zr-based alloys which contain Nb.

According to preferred embodiment, the inner component contains between 0.1 and 0.7 percentage by weight Sn, preferably between 0.1 to 0.4 percentage by weight Sn, 400 to 1500 ppm Fe, less than 600 ppm O (for example 300 ppm to 500 ppm O) and the rest Zr, except for impurities of a content that does not exceed that which is normally accepted in Zr or Zr-alloys for applications in nuclear reactors. Such an alloy has been shown to have very good properties at the same time as it has a suitable recrystallization temperature in order to be able to obtain substantially cRXA in the inner component at the same time as pRXA is obtained in the outer component. Examples of what is considered as acceptable impurities in this context is described for example in the above mentioned document EP 0 674 800 B 1, column 6. For example, impurities in Zr or Zr-alloys shall be below the limits that normally apply to reactor-grade zirconium, namely, Al 75 ppm, B 0.5 ppm, C 100 ppm, Ca 30 ppm, Cd 0.5 ppm, Cl 20 ppm, Co 20 ppm, Cu 50 ppm, H 25 ppm, Hf 100 ppm, Mg 20 ppm, Mn 50 ppm, Mo 50 ppm, N 65 ppm, Na 20 ppm, Nb 100 ppm, Ni 70 ppm, P 30 ppm, Pb 100 ppm, Si 100 ppm, Ta 200 ppm, Ti 50 ppm, U 3.5 ppm, V 50 ppm, W 100 ppm, and Cr 200 ppm.

Suitably, the inner component has a thickness such that it constitutes between 3% and 30%, preferably between 5% and 20% and most preferred 10% of the total thickness of the cladding tube.

According to a suitable embodiment, the final anneal is carried out at a temperature of between 485° C. and 550° C. during 1 h to 6 h, preferably during 2 h to 4 h.

As has been mentioned initially, the invention also concerns a use. Thereby a cladding tube produced according to the method according to any of the preceding embodiments is used in a fuel assembly for a nuclear boiling water reactor. Thereby, the above described advantages with such a cladding tube are achieved.

The invention also concerns a cladding tube as such, suitable to contain nuclear fuel and to be used in a nuclear boiling water reactor. This cladding tube comprises:

an outer cylindrical component mainly containing zirconium, an inner cylindrical component which at least mainly contains zirconium and which is metallurgically bonded to the outer component, wherein the material compositions of the inner component and the outer component differ from each other and are such that the inner component has a lower recrystallization temperature than the outer component. The inner component has a substantially completely recrystallized structure and the outer component has a structure such that it is partly recrystallized but not to the same extent as the inner component.

Such a cladding tube can be produced according to the above described method. With this cladding tube, the above described advantages are achieved. Advantageous embodiments of this cladding tube are clear from the dependent claims below. With these embodiments, the above described advantages are achieved.

Finally, the invention also concerns a fuel assembly for a nuclear boiling water reactor. This fuel assembly comprises:

an enclosing tube, and a plurality of cladding tubes according to the invention filled with nuclear fuel suitable for such cladding tubes for a boiling water reactor, wherein said plurality of cladding tubes are arranged inside said enclosing tube.

SHORT DESCRIPTION OF THE DRAWINGS

FIG. 1 shows schematically a fuel assembly.
FIG. 2 shows schematically a cross-section through a cladding tube according to the invention.

DESCRIPTION OF EMBODIMENTS OF THE INVENTION

FIG. 1 shows schematically a fuel assembly, known per se, for a BWR. The fuel assembly comprises an enclosing tube 2 (which here only is shown to the right in the figure). Within the enclosing tube 2, a number of fuel rods 3 are arranged. The fuel rods 3 extend from a top plate 5 to a bottom plate 6. The fuel rods 3 consist of cladding tubes which contain pellets with nuclear fuel material. In the figure, a number of pellets 4 are symbolically shown. At the top, the fuel rods 3 are provided with end plugs 8. The fuel rods 3 abut against the lower side of the top plate with the help of coiled springs 9. A plurality of spacers 7 are arranged in order to keep the fuel rods 3 at a distance from each other.

When a fuel assembly of for example the described kind is provided with a plurality of cladding tubes according to the present invention, it thus constitutes a fuel assembly according to the invention. It should be noted that there are different kinds of fuel assemblies for BWR. For example, there are fuel assemblies for BWR without a top plate. Furthermore, fuel assemblies for BWR often also comprise so-called part length rods. The present invention is of course applicable to different kinds of fuel assemblies for BWR.

FIG. 2 shows schematically a cross-section through a cladding tube according to the invention. The cross section shows the cladding tube strongly enlarged. In reality, the cladding tube has a dimension and a length that are suitable for use in a BWR. The cladding tube comprises an outer cylindrical component 10 and an inner cylindrical component 20. The inner component 20 may be called a liner.

Both the outer 10 and the inner 20 components contain mainly Zr. The inner component 20 is metallurgically bonded to the outer component 10. The material compositions of the inner 20 and the outer 10 components differ from each other and are such that the inner component 20 has a lower recrystallization temperature than the outer component 10. The inner component 20 has a completely recrystallized structure or at least a substantially completely recrystallized structure. The outer component 10 has a structure such that it is partly recrystallized but not to the same high extent as the inner component 20. The degree of recrystallization in the outer component 10 is suitably between 50% and 96%, preferably between 70% and 90%.

The outer component 10 may consist of Zircaloy 2 or Zircaloy 4 or other suitable alloy based on Zr. The inner component 20 may consist of pure Zr or a Zr-alloy, which thereby suitably is a low-alloy such that it has a lower recrystallization temperature than the outer component 10. The inner component 20 may consist of 0.1 to 0.4 percentage by weight Sn, 400 to 1500 ppm Fe, less than 600 ppm O and the rest Zr, except for impurities of a content that does not exceed that which is normally accepted in Zr or Zr-alloys for applications in nuclear reactors. The thickness of the inner component 20 may for example be 10% of the total thickness of the cladding tube.

The invention also concerns a method of producing a cladding tube for nuclear fuel for a nuclear boiling water reactor. The method according to the invention may be carried out in the following manner.

A tube is formed that comprises an outer cylindrical component 10, which for example may consist of Zircaloy 2, and an inner cylindrical component 20 which is metallurgically bonded to the outer component 10. The inner component 20 is also based on Zr and has a material composition such that it has a lower recrystallization temperature than the outer component 10. The inner component 20 may contain for example 0.25 percentage by weight Sn, about 500 ppm Fe, less than 600 ppm O and the rest Zr except for impurities of a content that does not exceed that which is normally accepted in Zr or Zr-alloys for applications in nuclear reactors. This tube may be formed in different manners, for example such as have been described in EP 0 674 800 B1. When the two components 10, 20 have been joined together, suitably a number of rolling steps with intermediate heat treatments are carried out.

After that the cladding tube has been formed according to the above and after possible rolling steps with there between occurring heat treatments, the cladding tube is final annealed at a temperature and during a time such that inner component 20 substantially completely recrystallizes in such that the outer component 10 partly recrystallizes but to a lower extent than the inner component 20. The final anneal is suitably carried out such that the degree of recrystallization in the outer component 10 is higher than 50% but less than 96%. A suitable time and temperature for the final anneal depend on the composition of the alloys. The temperature and time should therefore be selected such that the desired degrees of recrystallization are achieved in the components.

In for example Zircaloy 2, the Sn-content may vary between 1.2 and 1.7 percentage by weight. If the outer component for example contains 1.3 percentage by weight Sn, then a final anneal at a temperature of between 485° C. and 515° C. during 3 h has been shown to lead to a good result. If the Sn content in the outer component is 1.5 percentage by weight, the final anneal is suitably carried out at between 505° C. and 520° C. during 3 h.

The inner component 20 may for example have a thickness such that it constitutes about 10% of the total thickness of the cladding tube.

A cladding tube produced according to the method may suitably be used in a fuel assembly in a nuclear BWR.

The above described cladding tube and method only give examples of suitable materials. As has been pointed out above, other materials may be considered, for example a Zr—Nb alloy for the outer component and possibly pure Zr for the inner component.

The invention is not limited to the above described examples but may be varied within the scope of the following claims.

The invention claimed is:

1. A method of producing a cladding tube for nuclear fuel for a nuclear boiling water reactor, which method comprises the following steps:
    forming a tube comprising:
        an outer cylindrical component comprising a first composition comprising a zirconium-based alloy; and
        an inner cylindrical component metallurgically bonded to the outer component, wherein the inner component comprises a second composition comprising 0.1 to 0.4 percentage by weight Sn, 400 to 1500 ppm Fe, less than 600 ppm O and the rest Zr, except for impurities of a content that does not exceed that which is normally accepted in Zr or Zr-alloys for applications in nuclear reactors,
        wherein the first and second compositions materially differ from each other, and wherein the second composition has a lower recrystallization temperature than the first composition;
    rolling the tube; and
    finally annealing the cladding tube at a temperature and a time that results in a first degree of recrystallization of the outer component and a second degree of recrystallization of the inner component, wherein the second degree is at least 97 percent and wherein the first degree is less than the second degree and higher than 50%.

2. A method according to claim 1, wherein the second degree of recrystallization is 100% and the first degree of recrystallization is between 50% and 96%.

3. A method according to claim 1, wherein the first composition comprises Zircaloy 2 or Zircaloy 4.

4. A method according to claim 1, wherein the inner component has a thickness such that it constitutes between 3% and 30% of the total thickness of the cladding tube.

5. A method according to claim 1, wherein the step of finally annealing is carried out at a temperature between 485° C. and 550° C.

6. A method according to claim 1, wherein the step of finally annealing is performed for 1 h to 6 h.

7. A cladding tube for nuclear fuel for a nuclear boiling water reactor, which cladding tube comprises:
    an outer cylindrical component comprising a first composition comprising a zirconium-based alloy and having a first recrystallization temperature, wherein the outer cylindrical component has a first degree of recrystallization higher than 50 percent; and
    an inner cylindrical component comprising a second composition comprising 0.1 to 0.4 percentage by weight Sn, 400 to 1500 ppm Fe, less than 600 ppm O and the rest Zr, except for impurities of a content that does not exceed that which is normally accepted in Zr or Zr-alloys for applications in nuclear reactors, and having a second recrystallization temperature lower than the first recrystallization temperature, wherein the inner cylindrical component has a second degree of recrystallization greater than the first degree of recrystallization and at least 97 percent, wherein the inner cylindrical component is metallurgically bonded to the outer component, and wherein the first and second compositions materially differ from each other.

8. A cladding tube according to claim 7, wherein the second degree of recrystallization is 100% and the first degree of recrystallization is between 50% and 96%.

9. A cladding tube according to claim 7, wherein the first composition comprises Zircaloy 2 or Zircaloy 4.

10. A cladding tube according to claim 7, wherein the inner component has a thickness such that it constitutes between 3% and 30% of the total thickness of the cladding tube.

11. A method according to claim 1, wherein the second degree of recrystallization is at least 97 percent and the first degree of recrystallization is between 70 percent and 90 percent.

12. A cladding tube according to claim 7, wherein the second degree of recrystallization is 100% and the first degree of recrystallization in the outer component is between 70 percent and 90 percent.

13. The method of claim 1, wherein the step of finally annealing is carried out at a temperature between 485° C. and 515° C.

14. The method of claim 1, wherein the second composition consists essentially of 0.1 to 0.4 percentage by weight Sn, 400 to 1500 ppm Fe, less than 600 ppm O and the rest Zr, except for impurities of a content that does not exceed that which is normally accepted in Zr or Zr-alloys for applications in nuclear reactors.

15. The cladding tube according to claim 7, wherein the second recrystallization temperature is between 485° C. and 550° C.

16. The cladding tube according to claim 15, wherein the second recrystallization temperature is between 485° C. and 515° C.

17. The method of claim 10, wherein the step of finally annealing is carried out at a temperature between 485° C. and 515° C.

18. The method of claim 1, wherein the first degree of recrystallization is between 60 percent and 90 percent.

19. The cladding tube of claim 7, wherein the first degree of recrystallization is between 60 percent and 90 percent.

20. A fuel assembly for a nuclear boiling water reactor, comprising:
    an enclosing tube; and
    a plurality of cladding tubes according to claim 7 filled with nuclear fuel, wherein said plurality of cladding tubes are arranged inside said enclosing tube.

* * * * *